(No Model.) 4 Sheets—Sheet 1.

T. HARDING.
MACHINE FOR PITTING FRUIT.

No. 473,838. Patented Apr. 26, 1892.

WITNESSES
J.B. McGirr.
F.J. Benjamin

INVENTOR
Thomas Harding
by Smith & Low
attorneys.

THE NORRIS PETERS CO., PHOTO-LITHO., WASHINGTON, D. C.

(No Model.) 4 Sheets—Sheet 2.

T. HARDING.
MACHINE FOR PITTING FRUIT.

No. 473,838. Patented Apr. 26, 1892.

WITNESSES
F.J. Benjamin
S. Brashear

INVENTOR
Thomas Harding
by Smith & Low
attorneys (No Model.) 4 Sheets—Sheet 3.

T. HARDING.
MACHINE FOR PITTING FRUIT.

No. 473,838. Patented Apr. 26, 1892.

Witnesses:
J. R. McGirr.
T. J. Benjamin.

Inventor:
Thomas Harding
by Smith & Low
attorneys.

(No Model.) 4 Sheets—Sheet 4.

T. HARDING.
MACHINE FOR PITTING FRUIT.

No. 473,838. Patented Apr. 26, 1892.

Witnesses:
J. B. McGirr.
F. J. Benjamin.

Inventor:
Thomas Harding
by Smith & Low
attorneys.

UNITED STATES PATENT OFFICE.

THOMAS HARDING, OF SAN JOSÉ, CALIFORNIA.

MACHINE FOR PITTING FRUIT.

SPECIFICATION forming part of Letters Patent No. 473,838, dated April 26, 1892.

Application filed July 21, 1891. Serial No. 400,254. (No model.)

*To all whom it may concern:*

Be it known that I, THOMAS HARDING, a citizen of the United States, residing at San José, in the county of Santa Clara and State of California, have invented certain new and useful Improvements in Machines for Pitting Fruit; and I do declare the following to be a full, clear, and exact description of the invention, such as will enable others skilled in the art to which it appertains to make and use the same.

It is the object of my invention to provide for the ready removal from fruits of their stones or pits in such manner as to leave the pulp uncrushed and in such manner as to render the operation rapid and complete.

To this end my invention consists in the parts and combinations thereof hereinafter described and particularly claimed.

In order to make my invention more clearly understood, I have shown in the accompanying drawings a means for carrying the same into practical effect without, however, intending to limit myself to the exact construction which for the sake of illustration I have set forth.

Figure 1:
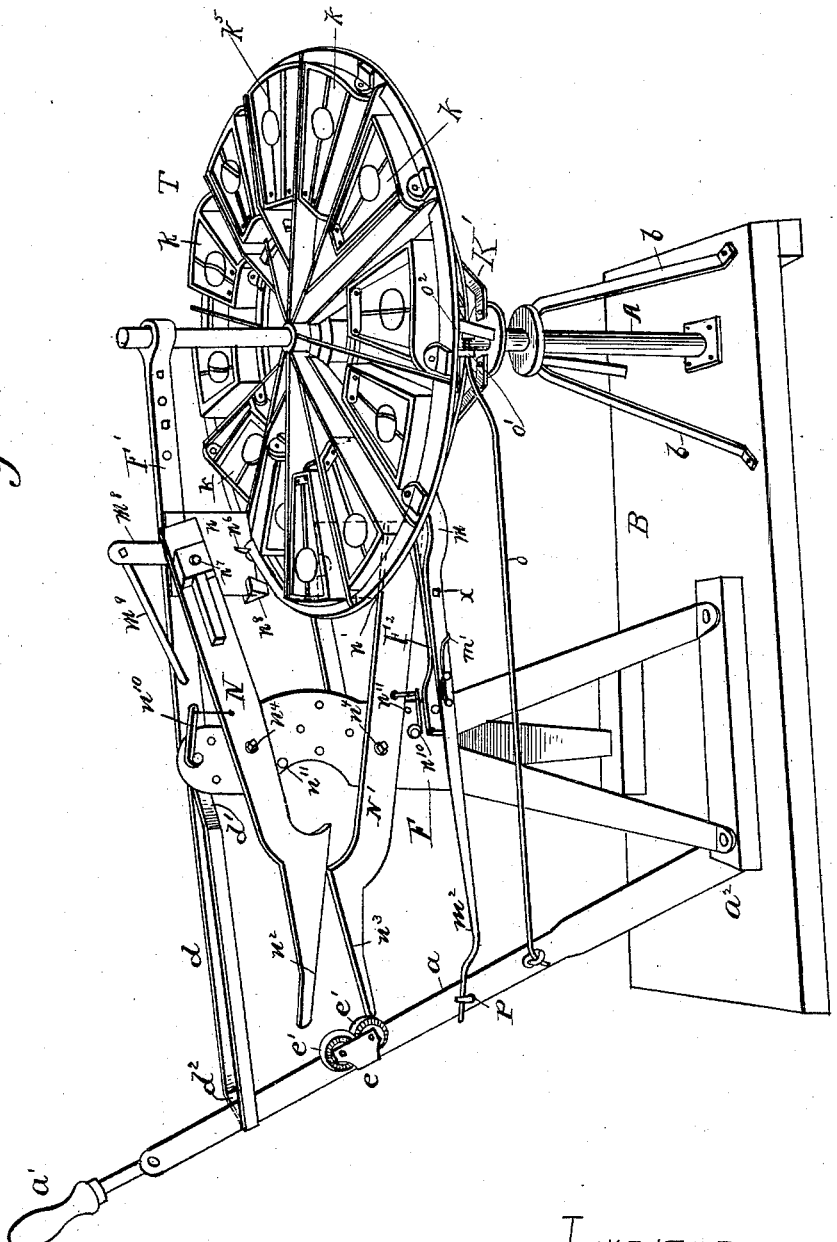
Figure 2:
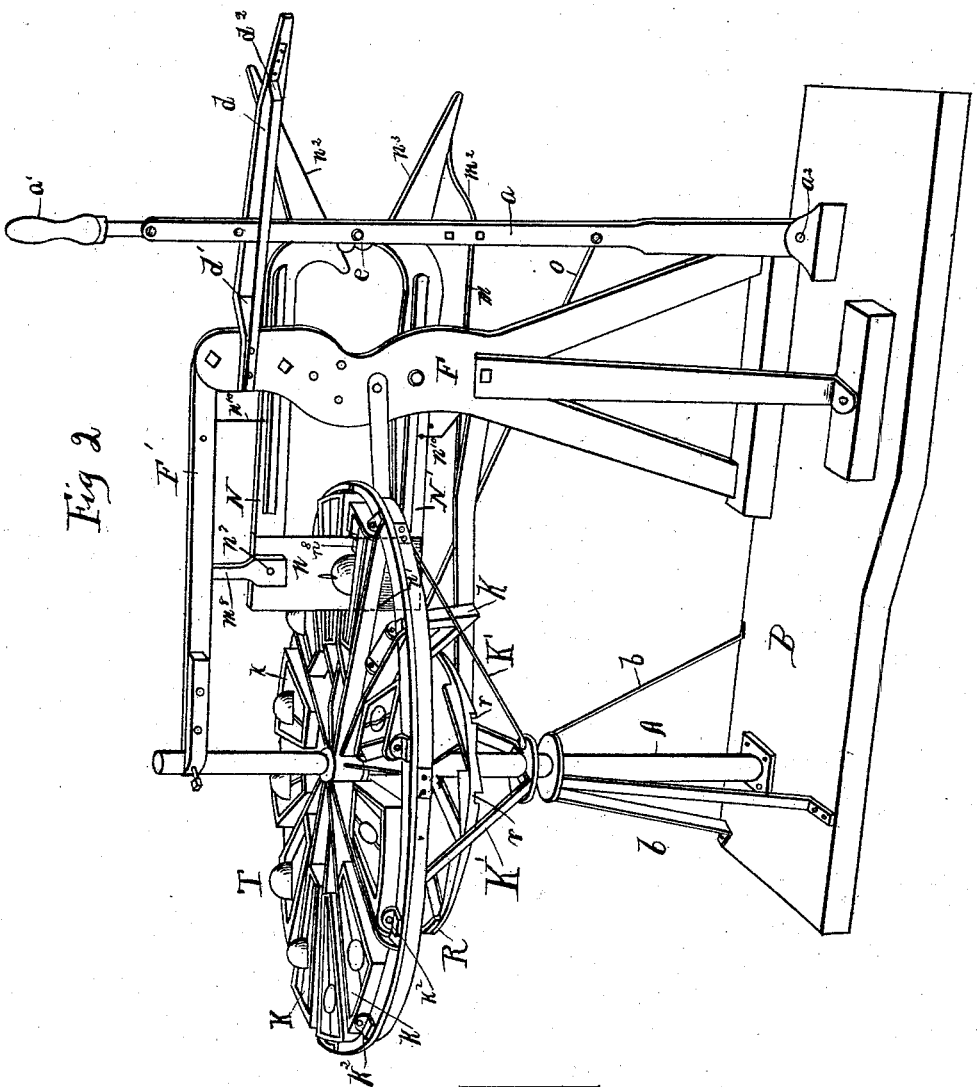
Figure 9A:
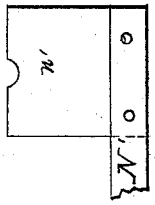
Figure 3:
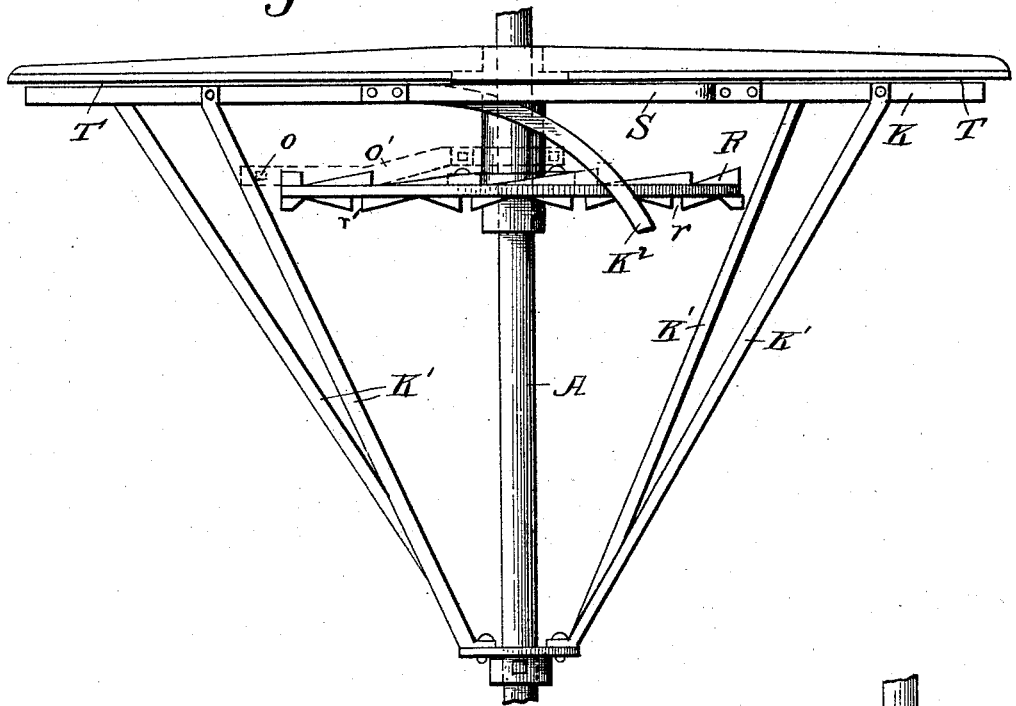
Figure 5:
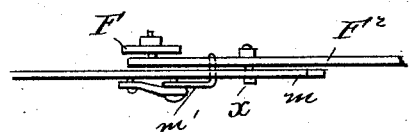
Figure 4:
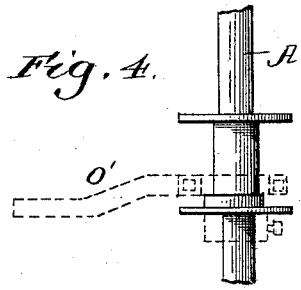
Figure 6:
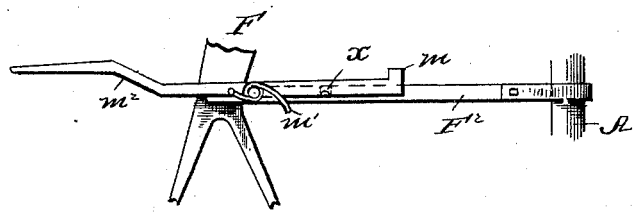
Figure 7:
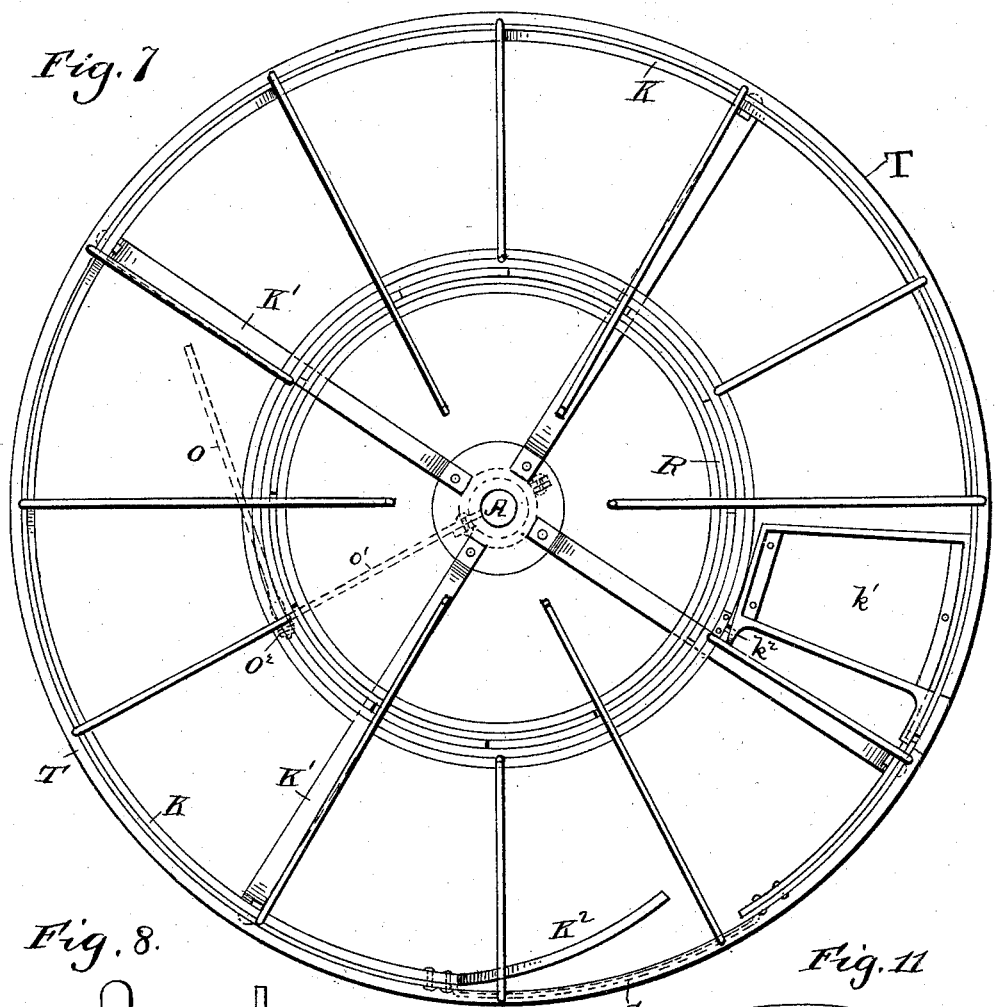
Figure 8:
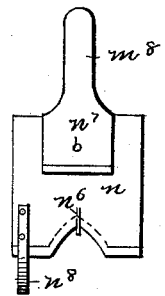
Figure 9:
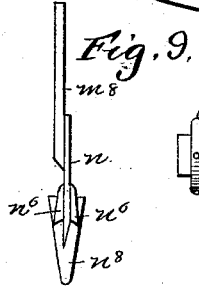
Figure 10:
Figure 11:
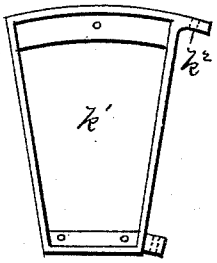
Figure 12:
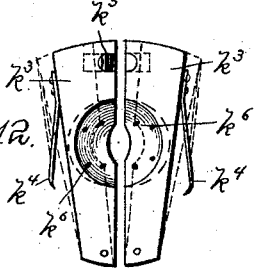

In said drawings, Figure 1 is a perspective view of a fruit-pitting machine embodying my invention, the devices which operate immediately upon the fruit being shown in their raised or retracted position. Fig. 2 is a similar view from the opposite side of the machine, showing the cutting devices in the act of operating upon the fruit. Fig. 3 is an elevation of the table-frame. Fig. 4 is an elevation illustrating the flanged sleeve which revolves on the post and carries the table. Fig. 5 is a plan view showing the stop-lever for the table. Fig. 6 is a side view illustrating the same. Fig. 7 is a plan view of the table with all but one of the fruit-trays removed. Fig. 8 is a side view of the upper knife. Fig. 9 is an edge view of the same. Fig. 9$^a$ is an elevation showing the lower knife. Fig. 10 is a view showing the inner side of one of the socket-pieces of a fruit-receptacle. Fig. 11 is a plan view of one of the frames for the fruit-receptacles. Fig. 12 is a plan view of one of the said receptacles.

Referring to the drawings, A represents a vertical shaft or post, which, as it is not necessary that it should revolve, may be stationarily mounted in suitable supports. I have shown it as resting upon a base or platform B, on which it is held upright by braces $b$. At its upper end the shaft is also supported by a brace F', extending from a frame F, which latter is rigidly mounted upon the base B.

T is a frame or table having a central bearing, which incloses and fits the shaft A in such manner that said table may be freely revolved thereon.

R is a peripheral or circular ratchet secured to the table and adapted to be engaged by a pawl or dog $o'$, which is loosely mounted on the shaft, Figs. 3 and 4, and is at its outer end connected with and actuated by a rod $o$. A spring $o^2$, Fig. 7, interposed between the rod $o$ and dog $o'$, prevents a sudden jar in starting the table. The table is also provided—as, for instance, upon the bottom edge of the ratchet-wheel R—with a series of notches $r$, adapted to be engaged by the inner end of a lever $m$, which is pivoted at $x$ to the brace-bar F$^2$, the latter serving to connect the frame F with the shaft A below the table. At the sides of the notches $r$ are formed inclines, which serve to automatically depress the inner or locking end of the lever $m$ preparatory to its entering said notches, the upward movement of the lever being caused by a spring $m'$, secured to the lever and engaging by its free end the under edge of the brace F$^2$.

$a$ is a movable part or bar from which motion is imparted to the various instrumentalities of the machine. In the construction shown it consists of a lever provided with a handle $a'$ and pivoted at $a^2$ to the base B. The rod $o$ is connected with and reciprocated by the lever $a$, and the lever $m$ plays in a loop or eye $p$, fixed on said part $a$, and being provided with a bend or incline $m^2$ is oscillated by the oscillation of part $a$.

The fruit to be operated upon is carried by a series of receptacles in or upon the table T and presented by its step-by-step rotation to the pitting devices. The fruits may be placed in their receptacles by hand, and this is the method used in the machine illustrated; but any suitable automatic mechanism may be employed for such purpose. The receptacles referred to consist of a series of trays $k$, formed by light metallic frames $k'$, mounted so as to be capable of tilting upon radial axes $k^2$ held in the frame of the table and each containing two or more socket-pieces $k^3$, preferably of wood. The latter pieces are pivotally connected at their inner ends with the frame $k'$, have formed between them and partly in each a hollow or socket for the fruit, and are normally pressed together at their outer ends by springs $k^4$, which are secured to the socket-pieces and bear against the inner sides of the frame. At its bottom the hollow for the fruit terminates in an aperture no larger than is necessary for the passage of the pit. There is thus furnished a sufficient support to hold the fruit up against the action of the pitting devices and at the same time the escape of large pits is permitted by the yielding of the springs $k^4$ and movement of the pieces $k^3$ away from each other.

The pivoted frames $k'$ are normally kept level by a circular track K, Fig. 7, upon which they rest and which is stationarily supported from the post A by braces K'; but at a certain point in the rotation of the table just after the operation of the pitting devices there is an interval in said track which permits the frames $k'$ to turn upon their pivots $k^2$ and drop into a vertical position, Fig. 2, and discharge the pitted fruit into a suitable receptacle. After passing the said opening or interval in the track K the frames carrying the fruit-trays again encounter an inclined part $K^2$ of the said track and are raised to and maintained in their normal horizontal position.

Having thus described the devices by which the fruit is received, presented to the pitting devices, and discharged, I will now set forth the means by which the fruit is cut and the pit removed. $n$ $n'$ indicate, respectively, the upper and lower knives, situated the one above and the other below the plane of the table T. They are mounted upon suitable knife bars or levers N N', pivoted at $n^4$ to the frame F. These levers have at their outer or rear ends inclines or cam-surfaces $n^2 n^3$, which are adapted to be engaged by a projection $e$, carried by the actuating-lever $a$. This projection preferably comprises two rollers $e'$, adapted to engage said cam-surfaces and having flanges, which bear against the sides of the levers and keep the rollers in place. The inward movement of the lever $a$ will thus operate in an obvious manner to cause the knives $n$ $n'$ to cut the upper and lower sides of the fruit, said knives being situated in the plane of the slit or space between the pieces $k^3$. $k^5$ indicates flaring guides secured to said pieces on each side of said slit and adapted to engage the knives and prevent any deviation from their proper vertical direction, thus insuring that they shall enter said slit. The knives are preferably provided with concavities in their edges adapted to co-operate with the hollows of the receptacles $k$ to prevent the fruit from slipping out of place as it is cut. The upper knife also serves to force the pit down through the bottom of the receptacle, and to this end it is provided with lateral wings or projections $n^6$, which more effectually engage the pit, and its lever N has its incline $n^3$ made longer than the incline $n^3$ for the purpose of giving to the upper knife a longer range of movement. The movement of the upper knife is also caused to be vertical by pivoting it at $n^7$ to the lever N and by connecting an upwardly-extending arm $m^8$ of the knife with the stationary frame-piece F' by means of a hinged link $m^9$. The separation or outward movement of the knives is caused by springs $n^{10}$, mounted on the frame F, and such movement is limited by stops $n^{11}$. $d$ is a guide for the lever $a$ and is provided at its inner end with an incline $d'$ and at its outer end with a substantially parallel incline $d^2$. These inclines are situated one upon each side of the lever $a$, and the guide $d$ is rigidly secured to the frame F. It will therefore be seen that when the lever $a$ has nearly reached the end of its inward movement and the wheels $e'$ have passed the inner ends of the inclines $n^2 n^3$ the incline $d'$ will engage said lever and deflect it from its normal position, carrying the projection $e$ out of the plane of the levers N N', so that the outward movement of the lever $a$ may take place without said projection encountering the knife-levers.

The mechanism hereinbefore described is timed as follows: First, the inward movement of the lever $a$ disengages the lever $m$ from its notch $r$ and causes the pawl $o'$ to advance and fall into engagement with a notch upon the ratchet R. At the same time the wheels $e'$ separate the inclines $n^2$ $n^3$ and cause the knives to cut a fruit from both top and bottom, the upper knife continuing its downward movement sufficiently to force out the pit. At the end of its (the lever's) inward movement the springs $n^{10}$ separate the knives, and the lever $a$ is deflected by the incline $d$, carrying the wheels $e'$ out of line with the said incline. The outward movement of the lever $a$ then causes the rod $o$ to rotate the table T one step, and permits the lever $m$ to engage the lower edge of said wheel R, and by entering one of the notches $r$ to stop the table at the proper point with the receptacle and fruit next to be operated upon in the plane of the knives.

The socket-pieces $k^3$ are provided with points $k^6$, situated in the hollows of the trays, Figs. 10 and 11, which penetrate and steady the fruit and act to draw apart the severed halves as the parts $k^3$ are forced outward and prevent bruising the fruit. This latter action of said parts is insured by a wedge $n^8$, carried by the upper knife, Figs. 8 and 9, which relieves the strain on the fruit-pit and knife-edge.

S, Figs. 3 and 7, is a metallic connecting-strap bent out of the way of the trays and uniting the ends of the track K, in order to keep the two parts of the track in their proper positions at each side of the space, which permits the dropping of the trays.

Having thus described my invention, what I claim, and desire to secure by Letters Patent of the United States, is—

1. In a fruit-pitting machine, the combination of two knives adapted to cut the fruit from opposite sides, and a rotary table situated between said knives and provided with trays having separable parts, substantially as set forth.

2. The combination, with a revolving table having a series of receptacles or means for holding the fruit, of cutting devices situated above and below the table adapted to operate upon the fruit as the latter is presented by the movement of the table, mechanism connecting said table with the cutting devices, and a latch for securing the table, also connected with and adapted to be operated by said mechanism, substantially as set forth.

3. The combination, with the upper and lower knives, and means for forcing the pit from the parts of the cut fruit, of the receptacles or trays for the fruit, made in parts held in frames mounted in the latter on vertical pivots and provided with springs, whereby they are enabled to yield in horizontal planes to permit the passage of the pit, substantially as set forth, the pivots being situated at or near the ends of the trays.

4. The combination, with the revolving table provided with a series of receptacles for the fruit, of the upper and lower knives $n\ n'$, levers carrying said knives and provided with inclines or cam-surfaces, and means for causing the oscillation of said levers to operate upon the fruit, substantially as set forth.

5. The combination, with the revolving table provided with a series of receptacles for the fruit, of the upper and lower knives $n\ n'$, levers carrying said knives and provided with inclines or cam-surfaces, and means for causing the oscillation of said levers to operate upon the fruit, one of said knives having a longer movement than the other and adapted to force out the pit of the fruit, substantially as set forth.

6. The combination of a revolving table provided with a series of tilting receptacles for the fruit, the knives $n\ n'$, levers carrying said knives and provided at their rear ends with inclines or cam-surfaces, a projection $e$, adapted to enter between said inclines to operate the knives, a bar or part $a$, carrying said projection, means for throwing the projection out of line with said inclines, and mechanism for revolving said table, substantially as set forth.

7. The combination, with the knives, of the tray having separable parts $k^3$, provided with the points $k^6$, substantially as set forth.

8. The combination, with the knife $n$, of the tray having separable parts $k^3$, and the wedge $n^8$, carried with the knife, substantially as set forth.

9. The combination, with the pivoted knife $n$, of a fruit-receptacle, lever $N$, means for actuating the latter, and link $m^9$, connecting the knife with a relatively fixed object, substantially as set forth.

10. The combination, with cutting devices, and means for forcing the pits from the parts of the cut fruit, of the horizontal rotary table, the receptacles or trays for the fruit hinged and adapted to tilt thereon and made in parts and provided with springs, whereby they are enabled to yield to permit the passage of the pit, substantially as set forth.

11. The combination of a revolving table, a series of tilting trays thereon, a track sustaining the trays and having an opening to permit their tilting, a cutting-knife, means for actuating the latter and rotating the table, and a latch or stop for holding the table with a tray beneath said knife, substantially as set forth.

In testimony whereof I affix my signature in the presence of two witnesses.

THOMAS HARDING.

Witnesses:
 D. D. TENNYSON,
 J. H. RUSSELL.